United States Patent [19]

Isogai et al.

[11] Patent Number: 5,420,233
[45] Date of Patent: May 30, 1995

[54] AGENT FOR VERTICAL ORIENTATION TREATMENT

[75] Inventors: Hideyuki Isogai; Toyohiko Abe, both of Funabashi, Japan

[73] Assignee: Nissan Chemical Industries Ltd., Tokyo, Japan

[21] Appl. No.: 76,646

[22] Filed: Jun. 15, 1993

[30] Foreign Application Priority Data

Jun. 23, 1992 [JP] Japan ................................. 4-164670

[51] Int. Cl.$^6$ ............................................. C08G 73/10
[52] U.S. Cl. ..................................... 528/353; 528/170; 528/171; 528/172; 528/173; 528/185; 528/188; 528/220; 528/229; 528/350; 428/1; 428/473.5
[58] Field of Search ................ 528/353, 170, 185, 171, 528/352, 172, 173, 220, 229, 188, 350; 428/1, 473.5

[56] References Cited

U.S. PATENT DOCUMENTS

| | | | |
|---|---|---|---|
| 4,686,147 | 8/1987 | Matsuyama et al. | 428/473.5 |
| 4,749,777 | 6/1988 | Kohtoh et al. | 528/353 |
| 5,046,822 | 9/1991 | Matsuda et al. | 428/473.5 |
| 5,053,480 | 10/1991 | Koto et al. | 528/188 |
| 5,064,697 | 11/1991 | Takiguchi et al. | 428/1 |
| 5,144,078 | 9/1992 | Nagase et al. | 528/183 |

FOREIGN PATENT DOCUMENTS

| | | |
|---|---|---|
| 0249881 | 12/1987 | European Pat. Off. . |
| 0282254 | 9/1988 | European Pat. Off. . |
| 0323644 | 7/1989 | European Pat. Off. . |
| 0337355 | 10/1989 | European Pat. Off. . |
| 0365855 | 5/1990 | European Pat. Off. . |
| 0415447 | 3/1991 | European Pat. Off. . |
| 0503918 | 9/1992 | European Pat. Off. . |
| 540829 | 5/1993 | European Pat. Off. . |
| 62-262829 | 11/1987 | Japan . |
| 63-259515 | 10/1988 | Japan . |
| 01180518 | 7/1989 | Japan . |
| 01180519 | 7/1989 | Japan . |
| 01214822 | 8/1989 | Japan . |

OTHER PUBLICATIONS

Molecular Crystals and Liquid Crystals, vol. 163, Oct. 1988, H. Fukuro, et al., "Newly Synthesized Polyimide for Aligning Nematic Liquid Crystals Accompanying High Pretilt Angles", pp. 157–162.

Primary Examiner—Samuel A. Acquah
Assistant Examiner—P. Hampton-Hightower
Attorney, Agent, or Firm—Oblon, Spivak, McClelland, Maier, & Neustadt

[57] ABSTRACT

An agent for vertical orientation treatment consisting essentially of a polyimide which contains a linear alkyl group having at least 12 carbon atoms in an amount of at least 5% by weight of the alkyl group to the total weight of the polyimide, and which, when a coating film of the polyimide is formed on a substrate, has a surface energy of not more than 38 dyn/cm.

8 Claims, No Drawings

AGENT FOR VERTICAL ORIENTATION TREATMENT

The present invention relates to a novel agent for vertical orientation treatment which is capable of orienting liquid crystal molecules vertically against a substrate. More particularly, it relates to an agent for vertical orientation treatment employing a polyimide containing a linear alkyl group, which is capable of stably orienting liquid crystal molecules vertically against a substrate and which has excellent electrical characteristics.

Liquid crystal cells are display elements utilizing electrooptical changes of liquid crystal, and they are small in size and light in weight and have an attractive characteristic such that power consumption is small. In recent years, they have found remarkable developments as display devices for various displays.

Among them, a typical representative is a twisted nematic (TN) electric field effect type liquid crystal cell employing a nematic liquid crystal having a positive dielectric anisotropy, wherein liquid crystal molecules are aligned in parallel with a pair of mutually facing electrode substrates at the respective interfaces to establish so-called homogeneous orientation, and the two substrates are assembled so that the oriented directions of the respective liquid crystal molecules cross each other. On the other hand, many electric field effect type liquid crystal cells are known in which a nematic liquid crystal having a negative dielectric anisotropy is used, such as an electric field control birefringence type (ECB type) wherein liquid crystal molecules are vertically aligned against a pair of mutually facing electrode substrates at the respective interfaces to establish so-called homoetropic orientation, so as to utilize the change in the birefringence of the liquid crystal layer when a voltage is applied, a phase conversion type (PC type) utilizing the change in the phase structure of liquid crystal, and a guest-host type (GH type) having dye molecules incorporated.

For a TN liquid crystal cell using a liquid crystal having a positive dielectric anisotropy, it is important to uniformly orient the long axis direction of liquid crystal molecules in parallel with the substrate surface and to orient the liquid crystal molecules at a certain inclined orientation angle (hereinafter referred to as a tilt angle) to the substrate. Two methods i.e. an inorganic film vapor deposition method and an organic film rubbing method are known as methods for orientation treatment to establish such homogeneous orientation. The inorganic film vapor deposition method is a method wherein an inorganic film is formed on a substrate by vapor-depositing an inorganic substance such as silicon oxide obliquely to the substrate so that liquid crystal molecules are orientated in the direction of vapor deposition. Although uniform orientation can be obtained by this method, the operation efficiency is poor, and this method is not practically used on an industrial scale.

The organic film rubbing method is a method in which an organic coating film is formed on a substrate surface, and the surface thereof is rubbed in a predetermined direction with a cloth of e.g. cotton, nylon or polyester, so that liquid crystal molecules will be oriented in the rubbing direction. For the organic film, a polyvinyl alcohol, a polyoxyethylene, a polyamide or a polyimide may, for example, be used. Among them, a polyimide is most commonly used from the viewpoint of the chemical stability, thermal stability, etc. By this method, uniform orientation can easily be obtained, and the durability of the liquid crystal cell and the stability of the display are excellent. Therefore, this polyimide rubbing treatment method is most commonly used on an industrial scale.

On the other hand, in a liquid crystal cell of ECB type, PC type or GH type employing a liquid crystal having a negative dielectric anisotropy, it is important to uniformly orient the long axis direction of liquid crystal molecules vertically to the substrate surface. As a method for orientation treatment to establish such homoetropic orientation, it is known to coat an ampholytic surfactant. For example, a method is known in which an organic solvent such as lecithin or hexadecyltrimethyl ammonium bromide is coated, or a substrate is treated with a solution of a monobasic carboxylic acid chromium complex or an organic silane coupling agent having a linear alkyl group ("Liquid Crystal-Application" coauthored by Koji Okano and Shunsuke Kobayashi, p 61, published by Baifukan in 1958).

In the method for orientation treatment to establish homogeneous orientation, a method for rubbing a polyimide excellent in the thermal stability and durability, has been developed. Further, in this rubbing method, various methods have been proposed for increasing the tilt angle. For example, Japanese Unexamined Patent Publication No. 142099/1987 proposes an agent for liquid crystal orientation treatment consisting of a reaction product of a linear alkyl amine with a polyamide resin precursor. Further, Japanese Unexamined Patent Publications No. 262527/1989 and No. 262528/1989 propose an agent for liquid crystal orientation consisting of a mixture of a linear alkyl compound with a polyimide resin precursor. Further, Japanese Unexamined Patent Publications No. 25126/1989 and No. 7333/1992 propose that a high tilt angle can be obtained by using a polyimide prepared from a diamine having an alkyl group as a starting material. Thus, as a result of the development of a polyimide rubbing method as a method for orientation treatment to establish stabilized homogeneous orientation, the TN liquid cell using the homogeneous orientation of liquid crystal having a positively dielectric anisotropy has found remarkable developments.

On the other hand, conventional methods for orientation treatment to establish homoetropic orientation, are designed in each case to treat the electrode substrates with a low molecular weight compound having a linear alkyl group. In such a case, uniform homoetropic orientation can certainly be obtained. However, the low molecular weight compound is likely to penetrate into the liquid crystal, whereby it is likely that the orientation is disturbed, the leak current of the liquid crystal cell increases, or the voltage-retaining properties deteriorates. Thus, this method is not necessarily satisfactory from the viewpoint of the stability and durability of the display of the liquid crystal cell. Thus, the fact that no satisfactory method for orientation treatment has been developed so as to provide a stabilized homoetropic orientation, has been one of the factors whereby a liquid crystal cell of e.g. ECB type, PC type or GH type employing homoetropic orientation of liquid crystal having a negative dielectric anisotropy, has not been developed as compared with the TN liquid crystal cell.

Accordingly, also in the method for orientation treatment to provide homoetropic orientation, it has been desired to develop a method for orientation treatment which is comparable with the polyimide rubbing method for homogeneous orientation and which is industrially efficient to provide stabilized orientation. For this purpose, it is necessary to develop an agent for vertical orientation treatment which provides stabilized homoetropic orientation.

The present inventors have conducted extensive studies to solve the above problems and as a result, have accomplished the present invention.

The present invention provides:

(1) an agent for vertical orientation treatment consisting essentially of a polyimide which contains a linear alkyl group having at least 12 carbon atoms in an amount of at least 5% by weight of the alkyl group to the total weight of the polyimide, and which, when a coating film of the polyimide is formed on a substrate, has a surface energy of not more than 38 dyn/cm;

(2) such an agent for vertical orientation, wherein the polyimide is a polyimide prepared by reacting and polymerizing a tetracarboxylic acid component with a diamine component containing no linear alkyl group and/or a diamine component containing the linear alkyl group and/or a monoamine component containing the linear alkyl group and/or a dicarboxylic acid component containing the linear alkyl group, to obtain a polyimide precursor containing the linear alkyl group, and imide-modifying the polyimide precursor;

(3) such an agent for vertical treatment, wherein the polyimide is a polyimide prepared by imide-modifying a polyimide precursor obtained by reacting and polymerizing a tetracarboxylic acid component with a diamine component containing no linear alkyl group, and a diimide precursor compound obtained by reacting a tetracarboxylic acid component with a monoamine component containing the linear alkyl group at a molar ratio of 1:2;

(4) such an agent for vertical orientation treatment, wherein the polyimide is a polyimide prepared by imide-modifying a polyimide precursor obtained by reacting and polymerizing a tetracarboxylic acid component with a diamine component containing no linear alkyl group, and a diimide precursor compound obtained by reacting a dicarboxylic acid component containing the linear alkyl group with a diamine component at a molar ratio of 2:1;

(5) such an agent for vertical orientation treatment, wherein the polyimide is a polyimide prepared by imide-modifying a polyimide precursor obtained by reacting and polymerizing a tetracarboxylic acid component with a diamine component containing the linear alkyl group;

(6) such an agent for vertical orientation treatment, wherein the polyimide is a polyimide prepared by imide-modifying a polyimide precursor obtained by reacting and polymerizing a tetracarboxylic acid component with a diamine component containing no linear alkyl group and a diamine component containing the linear alkyl group;

(7) such an agent for vertical orientation treatment, wherein the polyimide is a polyimide prepared by imide-modifying a polyimide precursor obtained by reacting and polymerizing a tetracarboxylic acid component with a diamine component containing no linear alkyl group and a dicarboxylic acid component containing the linear alkyl group and/or a monoamine component containing the linear alkyl group; and (8) such an agent for vertical orientation treatment according to the above item (2), wherein the tetracarboxylic acid component is cyclobutanetetracarboxylic dianhydride.

Now, the present invention will be described in detail with reference to the preferred embodiments.

The agent for vertical orientation treatment of the present invention consists essentially of a polyimide containing a linear alkyl group having at least 12 carbon atoms in an amount of 5% by weight of the alkyl group to the total weight of the polyimide, and when a coating film of this polyimide is formed on a substrate, the surface energy must be at most 38 dyn/cm. If the surface energy exceeds 38 dyn/cm, the liquid crystal molecules can not be oriented vertically.. The polyimide containing the linear alkyl group having at least 12 carbon atoms, presents stabilized uniform orientation, and presents a particularly high voltage-retaining property of the liquid crystal cell.

This polyimide containing the linear alkyl group can be obtained by reacting and polymerizing a tetracarboxylic acid component with a diamine containing no linear alkyl group and/or a diamine component containing the linear alkyl group and/or a monoamine component containing the linear alkyl group and/or a dicarboxylic acid component containing the linear alkyl group, to form a polyimide precursor containing the linear alkyl group, and imide-modifying the polyimide precursor. More specifically, a diimide compound containing the linear alkyl group may be mixed to a polyimide containing no linear alkyl group; a polyimide containing the linear alkyl group at the polyimide side chain, may be used; or the linear alkyl group may be reacted and introduced to the molecular terminal of a polyimide containing no linear alkyl group. However, to attain the stabilized vertical orientation purported by the present invention, the linear alkyl group must have at least 12 carbon atoms, and its content must be at least 5% by weight of the alkyl group to the total weight of the polyimide.

The tetracarboxylic acid component to be used to obtain the polyimide of the present invention, is not particularly limited.

Specific examples of the tetracarboxylic acid component include aromatic tetracarboxylic acids such as pyromellitic acid, 2,3,6,7-naphthalenetetracarboxylic acid, 1,2,5,6-naphthalenetetracarboxylic acid, 1,4,5,8-naphthalenetetracarboxylic acid, 2,3,6,7-anthracenetetracarboxylic acid, 1,2,5,6-anthracenetetracarboxylic acid, 3,3'4, 4'-biphenyltetracarboxylic acid, 2,3,3',4-biphenyltetracarboxylic acid, bis(3,4-dicarboxyphenyl)ether, 3,3',4,4'-benzophenonetetracarboxylic acid, bis(3,4-dicarboxyphenyl)sufone, bis(3,4-dicarboxyphenyl)methane, 2,2-bis(3,4-dicarboxyphenyl)propane, 1,1,1,3,3,3-hexafluoro-2,2-bis,(3,4-dicarboxyphenyl)propane, bis(3,4-dicarboxyphenyl)dimethylsilane, bis(3,4-dicarboxyphenyl)diphenylsilane, 2,3,4,5-pyridinetetracarboxylic acid and 2,6-bis(3,4-dicarboxyphenyl)pyridine, and dianhydrides thereof and dicarboxylic acid diacid halides thereof; alicyclic tetracarboxylic acids such as 1,2,3,4-cyclobutanetetracarboxylic acid, 1,2,3,4-cyclopentanetetracarboxylic acid, 1,2,4,5-cyclohexanetetracarboxylic acid, 2,3,5-tricarboxycyclopentylacetic acid and 3,4-dicarboxy-1,2,3,4-tetrahydro-1-naphthalenesuccinic acid, and dianhydrides thereof and dicarboxylic acid diacid halides thereof; and aliphatic tetracarboxylic acids such as 1,2,3,4-butanetetracarboxylic acid and dianhydrides thereof and dicarboxylic acid diacid halides thereof.

From the viewpoint of the transparency of the coating film, alicyclic tetracarboxylic acids, and dianhydrides thereof and dicarboxylic acid diacid halides thereof are particularly preferred. More preferred is 1,2,3,4-cyclobutanetetracarboxylic acid dianhydride.

These tetracarboxylic acids and their derivatives may be used alone or in combination as a mixture of two or more of them.

The diamine component containing the linear alkyl group to be used to obtain the polyimide of the present invention, is a diamine commonly used for the synthesis of a polyimide and is not particularly limited. Specific examples of such a diamine component include aromatic diamines such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl)methane, diaminodiphenyl sulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis (4-aminophenoxy)diphenylsulfone, 2,2-bis[4-(4-aminophenoxy)phenyl]propane, 2,2-bis(4-aminophenyl)hexafluoropropane and 2,2-bis[4-(4aminophenoxy)phenyl]hexafluoropropane; alicyclic diamines such as bis(4-aminocyclohexyl)methane; and aliphatic diamines such as tetramethylenediamine and hexamethylene diamine. Further, diaminosiloxanes such as the one represented by the following formula (1) may be mentioned:

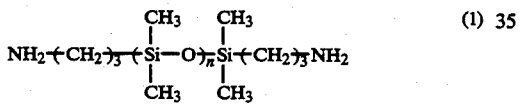  (1)

wherein n is an integer of from 1 to 10.

Such diamines may be used alone or in combination as a mixture of two or more of them.

Specific examples of the diamine component containing the linear alkyl group to be used to obtain the polyimide of the present invention, include a diaminobenzene derivative of the following chemical formula (2), a diaminobiphenyl derivative of the chemical formula (3), a diaminoterphenyl derivative of the chemical formula (4), a diaminodiphenyl ether derivative of the chemical formula (5), a diphenylmethane derivative of the chemical formula (6) and a bis(aminophenoxy)phenyl derivative of the chemical formula (7). In these formulas, R is a linear alkyl, alkyloxy or alkyloxymethylene group having at least 12 carbon atoms.

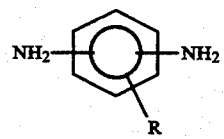 (2)

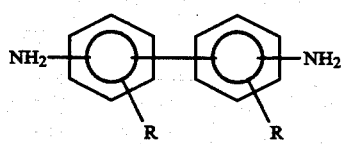 (3)

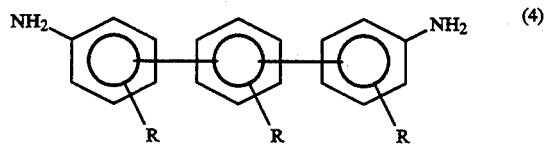 (4)

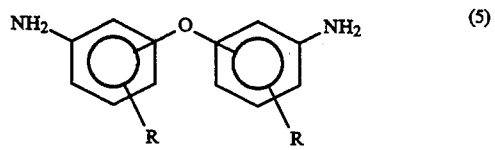 (5)

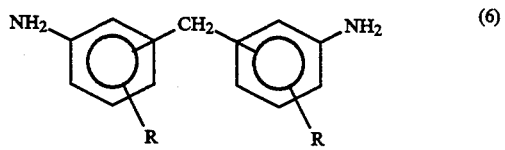 (6)

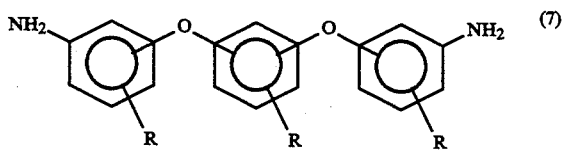 (7)

These alkyldiamines may be used alone or in combination as a mixture of two or more of them.

Specific examples of the monoamine containing the linear alkyl group to be used to obtain the polyimide of the present invention, include an aliphatic amine of the following chemical formula (8), an alicyclic diamine of the chemical formula (9) and an aromatic amine of the chemical formula (10). In these formulas, R is a linear alkyl, alkyloxy or alkyloxymethylene group having at least 12 carbon atoms.

These alkylamines may be used alone or in combination as a mixture of two or more of them.

 (8)

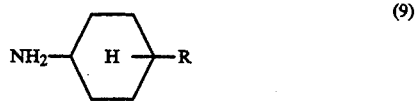 (9)

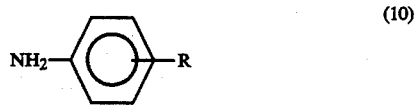 (10)

Specific examples of the dicarboxylic acid component containing the linear alkyl group to be used to obtain the polyimide of the present invention, include an aliphatic dicarboxylic acid of the following chemical formula (11), and an acid anhydride thereof and an acid halide thereof, an allcyclic dicarboxylic acid of the chemical formula (12), and an acid anhydride thereof and an acid halide thereof, and an aromatic dicarboxylic acid of the chemical formula (13), and an acid anhydride thereof and an acid halide thereof. In these formulas, R is a linear alkyl, alkyloxy or alkyloxymethylene group having at least 12 carbon atoms.

These dicarboxylic acid components may be used alone or in combination as a mixture of two or more of them.

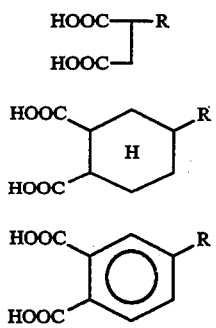

The tetracarboxylic acid component and the diamine component are reacted and polymerized to obtain a polyimide resin precursor, which is then imide-modified by dehydration ring closure. Here, it is common to employ a tetracarboxylic dianhydride as the tetracarboxylic acid component. The ratio of the total molar amount of the tetracarboxylic dianhydride to the total molar amount of the diamine component is preferably from 0.8 to 1.2. The closer this molar ratio to 1, the larger the polymerization degree of the resulting polymer, like in a usual polycondensation reaction.

If the polymerization degree is too small, the strength of the polyimide film tends to be inadequate when it is used as an orientation film, whereby the orientation of liquid crystal tends to be unstable. On the other hand, if the polymerization degree is too large, the operation efficiency during the formation of the polyimide resin film tends to be poor.

Accordingly, the polymerization degree of the product by this reaction is preferably from 0.05 to 3.0 dl/g (as measured in N-methylpyrrolidone at 30° C. at a concentration of 0.5 g/dl) as calculated as a reduced viscosity of the polyimide precursor solution.

One of the methods for obtaining the polyimide containing the linear alkyl group of the present invention is a method of incorporating a diimide compound containing the linear alkyl group. To obtain such a diimide compound, a dicarboxylic acid component containing the linear alkyl group and a diamine component are reacted in a molar ratio of 2:1 to obtain a diimide compound precursor, which is then imide-modified by dehydration ring closure, and/or a monoamine component containing the linear alkyl group and a tetracarboxylic dianhydride are reacted in a molar ratio of 2:1 to obtain a diimide compound precursor, which is then imide-modified by dehydration ring closure.

Further, one of the methods for obtaining the polyimide containing the linear alkyl group of the present invention is a method of introducing the linear alkyl group to the molecular chain terminal of a polyimide. This can be done by a method wherein a dicarboxylic acid component containing the linear alkyl group is reacted during the reaction and polymerization of the tetracarboxylic acid component and the diamine component, and/or a method wherein a monoamine component containing the linear alkyl group is reacted during the reaction and polymerization of the tetracarboxylic acid component and the diamine component. When the dicarboxylic acid component containing the linear alkyl group is reacted, the ratio (a/b) of the total molar amount a of the carboxylic acid residue of the tetracarboxylic acid component and the dicarboxylic acid component to the total molar amount b of the amine residue of the diamine component is preferably at most 2. When the monoamine compound containing the linear alkyl group is reacted, the ratio (a'/b') of the total molar amount a' of the carboxylic acid residue of the tetracarboxylic acid component to the total molar amount b' of the amine residue of the diamine component and the monoamine component is preferably at least 2.

If the molar ratio a/b is larger than 2 or if the molar ratio a'/b' is smaller than 2, when the polyimide precursor is imide-modified by dehydration ring closure, the reaction of the dicarboxylic acid component or the monoamine component tends to be inadequate, which in turn, tends to adversely affect the characteristics of the liquid crystal cell when used as the agent for liquid crystal orientation treatment.

It is common to react these tetracarboxylic acid component, diamine component, dicarboxylic acid component and monoamine component in an organic polar solvent such as N-methylpyrrolidone, N,N-dimethylacetamide or N,N-dimethylformamide.

The reaction temperature when these reactants are reacted to obtain a polyimide precursor, can be selected within a range of from −20° to 150° C., preferably from −5° to 100° C.

Such a polyimide precursor is heated and dehydrated at a temperature of from 100° to 400° C. or subjected to a chemical imide-modification by means of a commonly used imide-modification catalyst such as triethylamine/acetic anhydride, to obtain a polyimide. When the polyimide of the present invention is to be used as an agent for vertical orientation treatment, it is necessary to form a polyimide coating film having a uniform film thickness on a substrate provided with a transparent electrode.

The method for forming such a polyimide coating film is not particularly limited.

Usually, the polyimide precursor solution may be coated directly to a substrate and heated for imide-modification on the substrate to form a polyimide coating film. The polyimide precursor solution used here may be the above-mentioned reaction and polymerization solution, or the formed polyimide precursor is put into a large excess amount of a poor solvent such as water or methanol, precipitated and recovered, and then it may be dissolved again in a solvent for use.

The solvent for diluting the above-mentioned polyimide precursor solution and the solvent for dissolving the recovered polyimide precursor again are not particularly limited so long as they are capable of dissolving the polyimide precursor.

Specific examples of such solvents include N-methylpyrrolidone, N,N-dimethylacetamide and N,N-dimethylformamide. These solvents may be used alone or in combination as a mixture.

Further, in a case of a solvent which when used alone is incapable of providing a uniform solution, such a solvent may be incorporated to such an extent that a uniform solution can be obtained. Further, for the purpose of further improving the adhesion of the polyimide coating film to the substrate, it is of course preferred to incorporate an additive such as a coupling agent to the obtained polyimide solution.

The temperature for heating for imide-modification on the substrate may be at any optional level within a range of from 100° to 400° C., but it is particularly preferably within a range of from 150° to 250° C.

On the other hand, when the polyimide of the present invention is soluble in a solvent, the polyimide precursor may be imide-modified in a solution to obtain a polyimide solution.

In a case where the polyimide precursor is converted to the polyimide in a solution, it is common to employ a method of heating for dehydration ring closure. The ring closure temperature by dehydration under heating can be selected at an optional level within a range of from 100° to 350° C., preferably from 120° to 250° C.

Further, as another method of converting the polyimide precursor to the polyimide, ring closure can be chemically conducted by using a known catalyst for dehydration ring closure.

The polyimide solution thus obtained may be used as it is. Or, the polyimide may be precipitated in a poor solvent such as methanol or ethanol and isolated, and then it is dissolved again in a suitable solvent and used in the form of a solution.

The solvent for dissolving the polyimide again, is not particularly limited so long as it is capable of dissolving the obtained polyimide. For example, it may be 2-pyrrolidone, N-methylpyrrolidone, N-ethylpyrrolidone, N-vinylpyrrolidone, N,N-dimethylacetamide, N,N-dimethylformamide or γ-butylolactone.

Even a solvent which is incapable of dissolving the polyimide by itself, may be added to the above solvent to such an extent that it does not impair the solubility. Further, for the purpose of further improving the adhesion of the polyimide coating film to the substrate, it is of course preferred to incorporate an additive such as a coupling agent to the obtained polyimide solution.

This solution is coated on a substrate, and the solvent is evaporated, whereby a polyimide coating film can be formed on a substrate. The temperature for this operation may be at a level where the solvent can be evaporated and is usually from 80° to 150° C. Thus, a polyimide coating film having a thickness of from 200 to 3,000Å is formed on a transparent substrate of e.g. glass or a plastic film provided with a transparent electrode and can be used as an agent for liquid crystal orientation treatment.

The agent for orientation treatment of the present invention using a polyimide containing the linear alkyl group is capable of providing a stabilized homoetropic orientation when it is coated on a substrate and subjected to heat treatment.

Now, the present invention will be described in further detail with reference to Examples. However, it should be understood that the present invention is by no means restricted to such specific Examples.

EXAMPLE 1

19.2 g (0.098 mol) of 1,2,3,4-cyclobutanetetracarboxylic dianhydride (hereinafter referred to simply as CBDA), and 41.1 g (0.1 mol) of 2,2-bis[4-(4-aminophenoxy)phenyl]propane (hereinafter referred to simply as BAP) were reacted at room temperature for two hours in 341.1 g of N-methylpyrrolidone (hereinafter referred to simply as NMP) to obtain a polyimide precursor solution. The reduced viscosity (as measured at 30° C. in a 0.5% NMP solution) of this polyimide precursor was 0.98 dl/g.

Further, 64.8 g (0.2 mol) of N-hexadecylsuccinic anhydride and 41.0 g (0.1 mol) of BAP were reacted at room temperature for 12 hours in 599.5 g of NMP to obtain a diimide compound precursor solution.

70 g of the polyimide precursor solution and 30 g of the diimide compound precursor solution were mixed to obtain a solution of the linear alkyl group-containing polyimide precursor.

EXAMPLE 2

19.2 g (0,098 mol) of CBDA and 41.0 g (0.1 mol) of BAP were reacted at room temperature for two hours in 341.1 g of NMP to obtain a polyimide precursor solution. The reduced viscosity (as measured at 30° C. in a 0.5% NMP solution) of this polyimide precursor was 0.98 dl/g.

Further, 70.4 g (0.2 mol) of n-octadecylsuccinic anhydride and 41.0 g (0.1 mol) of BAP were reacted at room temperature for 12 hours in 631.3 g of NMP to obtain a diimide compound precursor solution.

80 g of the polyimide precursor solution and 20 g of the diimide compound precursor solution were mixed to obtain a solution of the linear alkyl group-containing polyimide precursor.

EXAMPLE 3

19.4 g (0.099 mol) of CBDA and 29.2 g (0.1 mol) of 1-dodecanoxy-2,4-diaminobenzene were reacted at room temperature for 8 hours in 275.4 g of NMP to obtain a solution of the linear alkyl group-containing polyimide precursor. The reduced viscosity (as measured at 30° C. in a 0.5% NMP solution) of this polyimide precursor was 0.66 dl/g.

EXAMPLE 4

19.4 g (0.099 mol) of CBDA, 10.4 g (0.03 mol) of 1-hexadecanoxy-2,4-diaminobenzene and 28.7 g (0.07 mol) of BAP were reacted at room temperature for 8 hours in 331.5 g of NMP to obtain a solution of the linear alkyl group-containing polyimide precursor. The reduced viscosity (as measured at 30° C. in a 0.5% NMP solution) of this polyimide precursor was 0.72 dl/g.

EXAMPLE 5

19.4 g (0,099 mol) of CBDA and 37.6 g (0.1 mol) of 1-octadecanoxy-2,4-diaminobenzene were reacted at room temperature for 8 hours in 323.0 g of NMP to obtain a solution of the linear alkyl group-containing polyimide precursor. The reduced viscosity (as measured at 30° C. in a 0.5% NMP solution) of this polyimide precursor was 0.54 dl/g.

COMPARATIVE EXAMPLE 1

19.2 g (0.098 mol) of CBDA and 41.0 g (0.1 mol) of BAP were reacted at room temperature for two hours in 341.1 g of NMP to obtain a polyimide precursor solution.

COMPARATIVE EXAMPLE 2

19.2 g (0.098 mol) of CBDA and 41.0 g (0.1 mol) of BAP were reacted at room temperature for two hours in 341.1 g of NMP to obtain a polyimide precursor solution. The reduced viscosity (as measured at 30° C. in a 0.5% NMP solution) of this polyimide precursor was 0.98 dl/g.

Further, 42.4 g (0.2 mol) of n-octylsuccinic anhydride and 41.0 g (0.1 mol) of BAP were reacted at room temperature for 12 hours in 472.6 g of NMP to obtain a diimide compound precursor solution.

70 g of the polyimide precursor solution and 30 g of the diimide compound precursor solution were mixed to obtain a solution of the linear alkyl group-containing polyimide precursor.

COMPARATIVE EXAMPLE 3

19.4 g (0.099 mol) of CBDA, 3.5 g (0.01 mol) of 1-hexadecanoxy-2,4-diaminobenzene and 36.9 g (0.09 mol) of BAP were reacted at room temperature for 8 hours in 338.9 g of NMP to obtain a solution of the linear alkyl group-containing polyimide precursor. The reduced viscosity (as measured at 30° C. in a 0.5% NMP solution) of this polyimide precursor was 0.98 dl/g.

REFERENCE EXAMPLE

Each of the polyimide precursor solutions obtained in Examples 1 to 5 and Comparative Examples 1 to 3 was diluted with NMP to obtain a solution having a resin concentration of 6%, which was then spin-coated on a glass substrate provided with a transparent electrode (300 rotations/5 seconds to 3,500 rotations/30 seconds) and then subjected to heat treatment at 80° C. for 5 minutes and at 180° C. for one hour to form a polyimide coating film, whereupon the surface tension of the polyimide and the vertical orientation when made into an oriented film, were measured by the following methods.

Evaluation of the surface tension: The contact angle $\theta_1$ of water and the contact angle $\theta_2$ of methylene iodide on the polyimide coating film were measured, and the surface tension $\gamma_s$ was calculated in accordance with the following formula.

$$\gamma_s = \gamma_s^d + \gamma_s^p$$

$$(1 + \cos\theta_1) \times 72.8 = 2\sqrt{\gamma_s^d \times 29.1} + 2\sqrt{\gamma_s^p \times 43.7}$$

$$(1 + \cos\theta_2) \times 50.8 = 2\sqrt{\gamma_s^d \times 46.8} + 2\sqrt{\gamma_s^p \times 4.0}$$

Evaluation of the vertical orientation: A cell was assembled by sandwiching a spacer of 50 μm by a pair of glass substrates having the polyimide coating films formed thereon, and a liquid crystal (ZLI-2806, manufactured by Merck Company) was injected to obtain a cell. The cell was observed by a polarization microscope, whereby vertical orientation was confirmed by observing isogyre at the center portion of the visual field.

| Agent for vertical orientation treatment | Alkyl group content (%)[1] | Surface tension (dyn/cm) | Vertical orientation[2] |
|---|---|---|---|
| Example 1 | 8.1 | 34.9 | ○ |
| Example 2 | 9.1 | 35.2 | ○ |
| Example 3 | 34.0 | 34.3 | ○ |
| Example 4 | 38.3 | 34.5 | ○ |
| Example 5 | 44.2 | 32.1 | ○ |
| Comparative Example 1 | 0 | 48.3 | X |
| Comparative Example 2 | 14.9 | 45.2 | X |
| Comparative Example 3 | 37.5 | 38.1 | X |

[1] Alkyl group content = weight of the alkyl groups in the polyimide ÷ weight of the polyimide × 100
[2] Vertical orientation
○: Clear isogyre was observed.
X: No isogyre was observed.

We claim:

1. An agent for vertical orientation treatment consisting essentially of a polyimide which contains a linear alkyl group having at least 12 carbon atoms in an amount of at least 5% by weight of the alkyl group to the total weight of the polyimide, and which, when a coating film of the polyimide is formed on a substrate, has a surface energy of not more than 38 dyn/cm.

2. The agent for vertical orientation treatment according to claim 1, wherein the polyimide is a polyimide prepared by reacting and polymerizing an aromatic, alicyclic or aliphatic tetracarboxylic acid component or derivative thereof, an aromatic, alicyclic or aliphatic diamine component or derivative thereof, or diaminosiloxanes containing no linear alkyl group and/or an aromatic, alicyclic or aliphatic diamine component or derivative thereof or diaminosiloxanes containing said linear alkyl group and/or an aromatic, alicyclic or aliphatic monoamine component containing said linear alkyl group and/or an aromatic, alicyclic or aliphatic dicarboxylic acid component or derivative thereof containing said linear alkyl group, to obtain a polyimide precursor containing said linear alkyl group, and imide-modifying the polyimide precursor.

3. The agent for vertical orientation treatment according to claim 2, wherein the polyimide is a polyimide prepared by imide-modifying a polyimide precursor obtained by reacting and polymerizing said tetracarboxylic acid component with said diamine component containing no linear alkyl group, and a diimide precursor compound obtained by reacting said tetracarboxylic acid component with said monoamine component containing said linear alkyl group at a molar ratio of 1:2.

4. The agent for vertical orientation treatment according to claim 2, wherein the polyimide is a polyimide prepared by imide-modifying a polyimide precursor obtained by reacting and polymerizing said tetracarboxylic acid component with said diamine component containing no linear alkyl group, and a diimide precursor compound obtained by reacting said dicarboxylic acid component containing said linear alkyl group with said diamine component at a molar ratio of 2:1.

5. The agent for vertical orientation treatment according to claim 2, wherein the polyimide is a polyimide prepared by imide-modifying a polyimide precursor obtained by reacting and polymerizing said tetracarboxylic acid component with said diamine component containing said linear alkyl group.

6. The agent for vertical orientation treatment according to claim 2, wherein the polyimide is a polyimide prepared by imide-modifying a polyimide precursor obtained by reacting and polymerizing said a tetracarboxylic acid component with said diamine component containing no linear alkyl group and said diamine component containing said linear alkyl group.

7. The agent for vertical orientation treatment according to claim 2, wherein the polyimide is a polyimide prepared by imide-modifying a polyimide precursor obtained by reacting and polymerizing said tetracarboxylic acid component with said diamine component containing no linear alkyl group and said dicarboxylic acid component containing said linear alkyl group and/or said monoamine component containing said linear alkyl group.

8. The agent for vertical orientation treatment according to claim 2, wherein said tetracarboxylic acid component is cyclobutanetetracarboxylic dianhydride.

* * * * *